Patented Aug. 17, 1937

2,090,023

UNITED STATES PATENT OFFICE 2,090,023

ANTHRAQUINONE DYESTUFFS

Berthold Bienert, Leverkusen-I. G.-Werk, Germany, assignor to General Aniline Works, Inc., New York, N. Y., a corporation of Delaware No Drawing. Application June 3, 1935, Serial No. 24,777. In Germany June 9, 1934

4 Claims. (Cl. 260—60)

The present invention relates to new acid wool dyestuffs of the anthraquinone series.

The new dyestuffs which are obtainable in accordance with my present invention correspond to the following formula

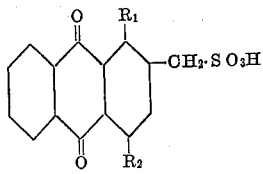

wherein $R_1$ and $R_2$ stand for aminogroups. They dye wool from an acid bath red-blue to green-blue shades of excellent fastness properties and are characterized by good equalizing properties. The aminogroups which are represented by the symbols $R_1$ and $R_2$ may be $-NH_2$, alkylaminogroups (such as methylamino-, ethylamino-, propylamino- or butylaminogroups) arylaminogroups (such as anilido-, acetylamino-anilido-, or alkoxyanilidogroups) or such groups as contain hydroaromatic nuclei such as a cyclohexylgroup or mixed aliphatic-aromatic residues such as a benzylgroup. Obviously, the anthraquinone nuclei as well as the nuclei contained in the aminogroups may have various substituents without departing from the sense of my present invention.

The 1-amino-4-halogenanthraquinonyl-2-methane-sulphonic acid serving as starting material can be prepared from the 1-chloro-2-ω-chloromethylanthraquinone, which is obtained by side chain chlorination of 1-chloro-2-methylanthraquinone. On heating with a sulphite solution of 1-chloro-2-ω-chloromethylanthraquinone is converted into the 1-chloro-anthraquinonyl-2-methane-sulphonic acid in a good yield. The chlorine atom of the 1-chloroanthraquinonyl-2-methane-sulphonic acid is exchangeable for basic residues and can very easily be exchanged for the $NH_2$-group for example, by heating with ammonia, whereby the 1-amino-anthraquinonyl-2-methane-sulphonic acid is formed, which can be brominated nearly quantitatively in an aqueous solution of hydrochloric acid. Instead of ammonia also methylamine or another aliphatic-aromatic mixed aliphatic-aromatic or hydroaromatic base can be used. Although in the last mentioned sulphonic acid, the sulpho group is not attached to the anthraquinone residue, in reaction with aliphatic, hydroaromatic and aromatic amines this sulphonic acid proceeds in an analogous manner to the 1-amino-4-bromoanthraquinone-2-sulphonic acid, which fact could not be expected.

The following examples illustrate the invention, without restricting it thereto.

EXAMPLE 1

(a) 1-chloro-2-ω-chloromethylanthraquinone

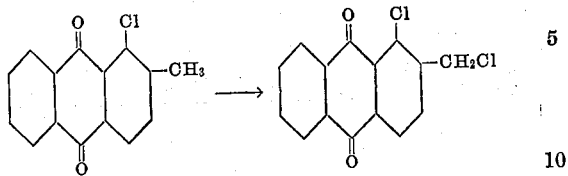

Into a solution of 250 grams of 1-chloro-2-methylanthraquinone in 500 ccm. of trichlorobenzene chlorine is introduced while exposing to a mercuryl lamp at about 140° C. until the increase of weight amounts to 33.3 grams. After cooling it is filtered by suction and washed with ligroin. The 1-chloro-2-ω-chloromethylanthraquinone is obtained in the form of light yellow crystals (melting point 165–167° C.) which still contain small amounts of 1-chloro-2-methylanthraquinone which can be separated on further working up. That part of the 1-chloro-2-ω-chloromethylanthraquinone which is still in solution may be isolated by precipitation with ligroin.

(b) 1-chloroanthraquinonyl-2-methane sulphonic acid

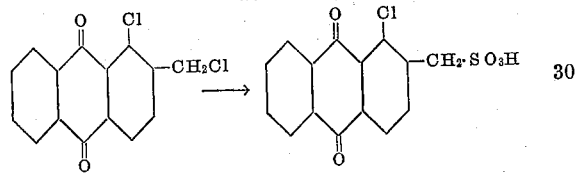

50 grams of 1-chloro-2-ω-chloromethylanthraquinone are pasted by dissolving in concentrated sulphuric acid and pouring into water, the paste is washed neutral and sieved and then made up to a content of 1500 grams; thereupon it is mixed with 150 grams of a solution of bisulphite, neutralized against triazine paper with a concentrated solution of caustic soda and boiled (3–4 hours at the most), until the reaction product is completely dissolved. It is salted out with 150 grams of sodium chloride while hot, after cooling filtered off by suction and then washed again with a 10% sodium chloride solution. The crude sodium salt of the 1-chloro-anthraquinonyl-2-methane sulphonic acid is boiled in 1500 ccs. of water with the addition of 150 ccs. of concentrated hydrochloric acid, separated by suction while hot from a small amount of 1-chloro-2-methyl-anthraquinone, the filtrate is then neutralized with a caustic soda solution and salted out while hot with 150 grams of sodium chloride. After cooling it is filtered with suction, washed with a 10% solution of sodium chloride and dried. The sodium salt of the 1-chloroanthraquinonyl-2-methane sulphonic acid forms long light yellowish needles.

(c) *1-amino-anthraquinonyl-2-methane sulphonic acid*

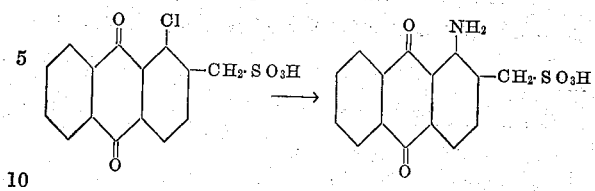

50 grams of the sodium salt of 1-chloroanthraquinonyl-2-methane sulphonic acid are heated for 4 hours to 120° C. in a rotary autoclave with 1000 ccs. of ammonia (about 25%), to which 0.5 gram of copper chloride has been added. After cooling the crystallized sodium salt of 1-aminoanthraquinonyl-2-methane sulphonic acid is filtered by suction and washed with a 10% solution of sodium chloride. For purification the crude salt is dissolved in 1500 ccs. of hot water, filtered off from the dark residue and the filtrate is then mixed with 150 grams of sodium chloride at a temperature of 90° C. After cooling it is filtered off by suction and washed with a 10% solution of sodium chloride. The sodium salt of the 1-aminoanthraquinonyl-2-methane sulphonic acid forms a crystalline brownish-red powder.

(d) *1-amino-4-bromo-anthraquinonyl-2-methane sulphonic acid*

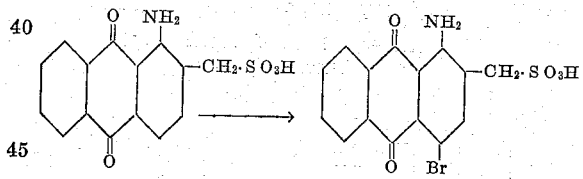

50 grams of the sodium salt of 1-aminoanthraquinonyl-2-methane-sulphonic acid, dissolved in 1250 ccs. of water, are mixed with 248 ccs. of dilute hydrochloric acid containing 10% bromine in the course of 1 hour at a temperature of 20° C., stirring is continued at this temperature for 2 hours and thereupon the mixture is slowly heated to 90° C. This temperature being reached the reaction product is slowly salted out with 125 grams of sodium chloride, then stirred until cold, filtered and washed with a 10% solution of sodium chloride. The sodium salt of the 1-amino-4-bromoanthraquinonyl-2-methane sulphonic acid forms orange-red needles grouped in star shaped clusters.

(e) *1-amino-4-anilidoanthraquinonyl-2-methane sulphonic acid*

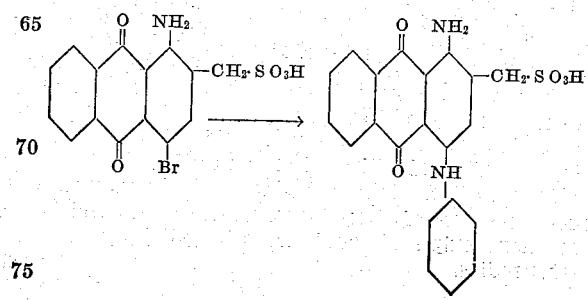

A mixture of 500 ccs. of water, 5 grams of the sodium salt of 1-amino-4-bromoanthraquinonyl-2-methane-sulphonic acid, 15 grams of sodium carbonate, 60 ccs. of aniline and 0.25 gram of copper sulphate is heated to boiling for 3 hours whereby the originally red coloration of the solution turns to blue. Thereupon hydrochloric acid is added until an acid reaction is produced, the reaction product is then filtered off by suction while still hot and washed with a 2% solution of sodium chloride. The crude dyestuff is dissolved in water, boiled with animal charcoal, filtered, and the filtrate is carefully salted out by means of potassium chloride. The potassium salt of the 1-amino-4-anilidoanthraquinonyl-2-methane-sulphonic acid is obtained in fine blue needles, which dye wool from an acid bath clear blue shades of good equalizing properties.

EXAMPLE 2

*1-amino-4.4'-acetylaminoanilidoanthraquinonyl-2-methane-sulphonic acid*

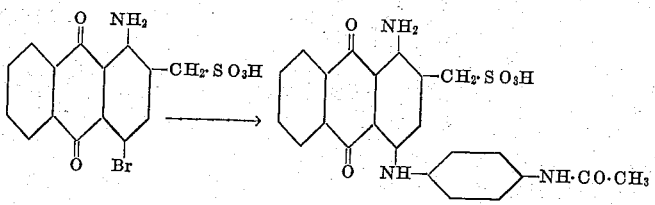

A mixture of 500 ccs. of water, 10 grams of the sodium salt of 1-amino-4-bromo-anthraquinonyl-2-methane sulphonic acid, 30 grams of para-aminoacetanilide, 30 grams of sodium bicarbonate and 0.5 gram of copper sulphate is heated while stirring to 75-85° C. for 1 to 1½ hours. After cooling the dyestuff having crystallized is filtered off by suction, washed with a dilute solution of sodium chloride, dissolved in water, boiled with animal charcoal, filtered and the filtrate slowly salted out with potassium chloride at 90° C. filtered with suction while still hot and washed again with a 2% solution of potassium chloride.

The potassium salt of the 1-amino-4.4'-acetylamino-anilido-anthraquinonyl-2-methane sulphonic acid is obtained in a good yield and dyes wool clear, greenish-blue shades.

EXAMPLE 3

*1-amino-4-hexahydroanilidoanthraquinonyl-2-methane-sulphonic acid*

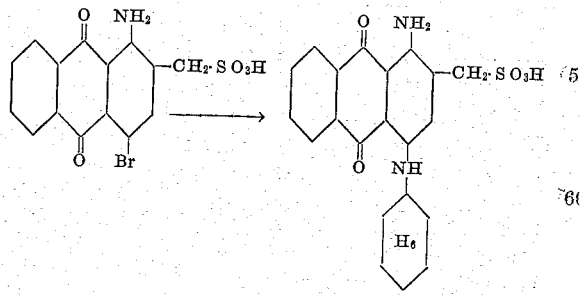

A mixture of 500 ccs. of water, 10 grams of the sodium salt of 1-amino-4-bromoanthraquinonyl-2-methane sulphonic acid, 90 ccs. of hexahydroaniline, 30 ccs. of a concentrated caustic soda solution and 0.5 gram of copper sulphate is heated to boiling for 1 to 2 hours. Thereupon it is allowed to cool, acidified with concentrated hydrochloric acid and the separated dyestuff is filtered off by suction and washed with a dilute solution of sodium chloride. The crude dyestuff is dissolved in water to which a small amount of a concentrated caustic soda solution has been added, boiled with animal charcoal and the filtrate is salted out at 90° C. by means of potassium chloride. The potassium salt of the 1-amino-4-hexahydroanilidoanthraquinonyl-2-methane sulphonic acid separates in the form of glittering needles is filtered off by suction while still warm and washed with a 2% potassium chloride solution. It dyes wool from an acid bath clear reddish-blue shades.

EXAMPLE 4

15 ccs. of hexahydroaniline are stirred with 100 grams of water, 5 grams of 1-chloro-anthraquinonyl-2-methane sulphonic acid and 5 grams of a potassium hydroxide lye of 44% strength. A solution of 0.25 gram of cupric chloride are added thereto and the mixture is boiled for about 7 hours. After removing the excess of hexahydroaniline by steam distillation the reaction product is salted out from the hot solution by means of potassium chloride and purified by dissolving the same in water and a new salting out operation by means of potassium chloride. The 1-hexahydroanilidoanthraquinonyl-2-methane sulphonic acid represents red-brown needles and is obtained in a yield of about 60%.

(a) 1440 grams of water, 71.3 grams of the 1 - hexahydro-anilido-anthraquinonyl - 2 - methane sulphonic acid are added drop by drop 275 ccs. of a 10% solution of bromine in aqueous hydrochloric acid at a temperature of 18–20° C. After some hours standing the precipitate is sucked off, dissolved in water, whereupon the reaction product is salted out by means of potassium hydroxide. The 1-hexahydroanilidoanthraquinonyl-4-bromo-2-methane-sulphonic acid is obtained in form of red-brown needles in a yield of about 60%.

(b) Into a mixture of 215 grams of water, 25 grams of ethylalcohol, 6 grams of the product obtained as described in the preceding paragraph, 15 grams of para-anisidine and 15 grams of sodium carbonate there is gradually added a solution of 0.25 gram of cupric chloride in 10 grams of water. The whole is then stirred for about 2 hours at 55–60° C. The precipitate is sucked off, dissolved in a mixture of water and alcohol at 50° C. and salted out. The 1-hexahydroanilido - 4 - para - anisididoanthraquinonyl-2-methane-sulphonic acid thus obtained represents blue-green needles which dye wool from an acid bath steel-blue shades.

EXAMPLE 5

Into 400 grams of a methylamine solution of 25% strength are added while cooling and stirring 38 grams of a concentrated hydrochloric acid solution. The mixture is heated in a closed vessel with 25 grams of the sodium salt of 1-chloroanthraquinonyl-2-methane-sulphonic acid and 0.25 gram of cupric chloride for about 4 hours at 60–65°. After cooling the precipitate is sucked off and washed with a 10% sodium chloride solution. The residue is dissolved in 750 grams of water and freed from impurities by a hot filtration. The filtrate is salted out by means of 75 grams of sodium chloride at 90° C. and after cooling the precipitate is sucked off and washed by means of a 10% sodium chloride solution. The 1-methylamidoanthraquinonyl-2-methane-sulphonic acid is obtained in form of a bluish-red powder in a yield of about 67%.

(a) Into 393 grams of water, 15.7 grams of the sodium salt of the acid obtained as described in the preceding paragraph are added at 18–20° C. in the course of 1 hour 71 ccs. of a 10% bromine solution in aqueous hydrochloric acid. The mixture is stirred for some hours; the hydrochloric acid salt of the 1-methylamidoanthraquinonyl-4-bromo-2-methane-sulfonic acid crystallizes out in form of slightly colored needles. It is sucked off and the free acid is isolated therefrom by means of sodium carbonate.

(b) 441 grams of water, 9 grams of the product obtained as described in the preceding paragraph, 27 grams of para-aminoacetanilide, 27 grams of sodiumbicarbonate and 9 ccs. of a saturated copper sulfate solution are heated for 1 to 2 hours to 70–80°. The reaction product is salted out by means of sodium chloride and then treated with an aqueous hydrochlorid acid at 90° C. After suction the precipitate is washed with water. It is then added into 1 liter of water made alkaline by means of sodium hydroxide and boiled with the addition of animal charcoal, and after filtration salted out with potassium chloride at 90° C. The 1-methylamido-4-para-anisidido-anthraquinonyl - 2 - methane-sulfonic acid represents green needles which dye wool from an acid bath blue-green shades.

I claim:—

1. The products of the general formula

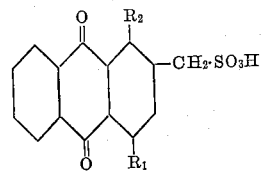

wherein $R_1$ and $R_2$ stand for aminogroups selected from the group consisting of $NH_2$-, alkylamino-, arylamino-, hydroarylamino- and aralkylamino groups, the said products being acid wool dyestuffs and dyeing wool red-blue to green-blue shades.

2. The products of the general formula

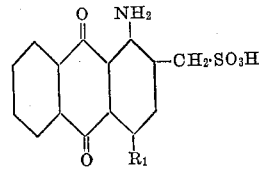

wherein $R_1$ stands for an arylaminogroup the said products being acid wool dyestuffs and dyeing wool blue-shades.

3. The 1-amino-4-anilidoanthraquinonyl - 2 - methane-sulphonic acid.

4. The 1-amino-4,4'-acetylaminoanilidoanthraquinonyl-2-methane-sulphonic acid.

BERTHOLD BIENERT.